(12) United States Patent
Ojha et al.

(10) Patent No.: US 8,868,056 B2
(45) Date of Patent: Oct. 21, 2014

(54) SYSTEMS AND METHODS OF DEVICE CALIBRATION

(75) Inventors: Anuj Ojha, San Diego, CA (US); Isan A. Doshi, San Diego, CA (US); Deepu John, San Diego, CA (US); Brian M. George, San Diego, CA (US); Sudarsan Krishnan, San Diego, CA (US); Benjamin A. Cheadle, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 13/586,060

(22) Filed: Aug. 15, 2012

(65) Prior Publication Data

US 2013/0210411 A1    Aug. 15, 2013

Related U.S. Application Data

(60) Provisional application No. 61/524,918, filed on Aug. 18, 2011.

(51) Int. Cl.
*H04B 17/00*    (2006.01)
*H04W 24/00*    (2009.01)
*H04W 8/24*    (2009.01)

(52) U.S. Cl.
CPC .............. *H04W 8/245* (2013.01); *H04W 24/00* (2013.01); *H04B 17/0062* (2013.01)

USPC ........................................ 455/418; 455/67.11

(58) Field of Classification Search
USPC ................. 455/67.11, 418; 370/334
See application file for complete search history.

(56) References Cited

U.S. PATENT DOCUMENTS

| | | | |
|---|---|---|---|
| 6,795,407 | B2 | 9/2004 | Chesson |
| 6,806,844 | B2 | 10/2004 | Azuma |
| 6,960,999 | B2 | 11/2005 | Haimovitch et al. |
| 7,633,905 | B1 | 12/2009 | Harel et al. |
| 8,027,643 | B2 | 9/2011 | Osterling et al. |
| 2008/0248771 | A1* | 10/2008 | Dunworth et al. ............. 455/258 |
| 2008/0294362 | A1* | 11/2008 | Piipponen et al. .............. 702/85 |
| 2009/0022178 | A1 | 1/2009 | Ji et al. |
| 2010/0029267 | A1* | 2/2010 | Yang et al. .................... 455/425 |
| 2010/0216407 | A1* | 8/2010 | Gormley .................... 455/67.11 |

OTHER PUBLICATIONS

International Search Report and Written Opinion—PCT/US2012/051365—ISA/EPO—Nov. 19, 2012.

* cited by examiner

*Primary Examiner* — Myron K Wyche
(74) *Attorney, Agent, or Firm* — Eric Ho

(57) ABSTRACT

A method includes receiving, at a device to be calibrated, a data packet from a second device that is directing the calibration. The data packet includes at least two segments, where each segment corresponds to at least one calibration instruction. The method includes conducting a calibration of the device according to the calibration instructions corresponding to the at least two segments.

26 Claims, 9 Drawing Sheets

SYSTEMS AND METHODS OF DEVICE CALIBRATION

CROSS-REFERENCE TO RELATED APPLICATIONS

The present application claims priority from commonly owned U.S. Provisional Patent Application 61/524,918 filed Aug. 18, 2011 and entitled SYSTEMS AND METHODS FOR CALIBRATION OPTIMIZATION, the content of which is expressly incorporated herein by reference in its entirety.

FIELD OF THE DISCLOSURE

The present disclosure relates generally to systems and methods of device calibration.

BACKGROUND

Mobile telephones are often calibrated in the factory (during factory test mode, "FTM") before being sent to customers. The calibration involves having a calibration application send calibration instructions to the phone. The phone then executes the requested calibrations according to the received calibration instructions. At least some calibration instructions, when executed, provide calibration results, which the phone may then provide to the calibration application.

Current calibration schemes involve sending the phone multiple sets of calibration instructions, one at a time, using multiple data packets. Additionally, each of the calibration instructions is set to be carried out for a fixed duration of time, regardless of the length of time actually required for the given calibration instruction. The fixed duration is often longer than necessary, because the length of the fixed duration is set so as to accommodate the longest possible calibration duration. Thus, calibration time is longer than necessary, due to the overhead in sending each instruction sent in a different packet and due to the fixed time duration of each of the instructions.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

The disclosed systems and methods enable a calibration application executing on a host device (e.g., a personal computer) to send multiple calibration commands to a phone (e.g., a cellular phone or other mobile communication device). After the calibration commands have been sent to the phone, a start message may be sent to the phone to initiate calibration operations at the phone. The calibration commands may be sent to the phone in one or more calibration configuration packets (CCPs). Each CCP includes one or more segments, and each of the segments includes one or more calibration instructions. Thus, multiple calibration instructions may be sent in a single CCP, which may be faster than sending calibration instructions one-at-a-time. Moreover, each segment may include a segment duration, thereby enabling a calibration system to set individual durations for individual calibration instructions (when a single instruction is included in a segment) or a set of calibration instructions (when the set of instructions is included in the segment). For example, a segment having one or more fast-executing instructions may have a shorter segment duration than a segment having one or more relatively slow-executing instructions. Setting individual durations for individual calibration instructions (or sets of calibration instructions) may enable faster completion of calibration when compared to techniques in which all calibration instructions have the same fixed-length duration. During calibration, the phone may perform multiple calibration operations in parallel to further reduce overall calibration time. After calibration is completed, the host device may fetch calibration results.

Figure 1:
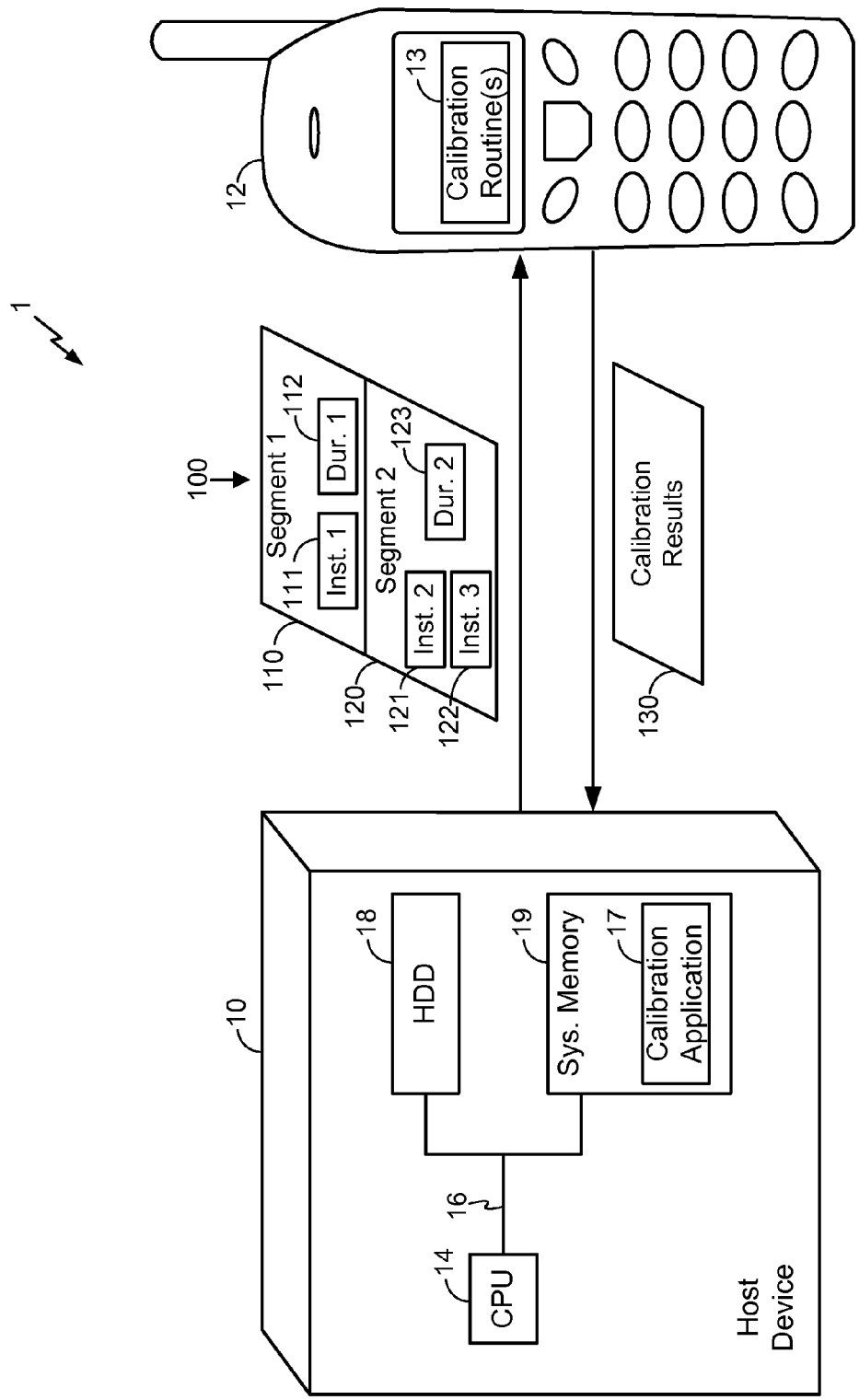
FIG. 1 illustrates a schematic diagram of a system in accordance with an embodiment of the present disclosure.

FIG. 1 illustrates a system 1 in accordance with an embodiment. The system 1 includes a host device 10 and a user equipment ("UE") 12 (e.g., a mobile phone or other wireless communication device), and supports communication of data packets between the host device 10 and the UE 12 to configure the calibrations of the UE 12.

As described in more detail below, embodiments of the present disclosure relate to systems and processes for calibration, such as calibrating a mobile phone. According to various embodiments, the calibration instructions are consolidated together to reduce or minimize the number of calibration configuration handshakes between the calibration application executing at the host device 10 and the device being calibrated (e.g., the UE 12). According to various embodiments, the duration for the calibration specified in the calibration instructions can vary among different calibration instructions.

The host device 10 includes an electronic computing device including, but not limited to, one or more general-purpose computers, including one or more processing units or processors (e.g., a central processing unit (CPU) 14), a system memory 19, and a system bus 16 that couples various system components including the system memory 19 to the CPU 14. The system memory 19 includes any suitable device or devices for storing electronic data, including, but not limited to, random access memory (RAM). The computer(s) includes a storage medium, such as, but not limited to, one or more solid state storage devices and/or magnetic hard disk drives (HDD) for reading from and writing to a magnetic hard disk, magnetic disk drives for reading from or writing to a removable magnetic disk, and optical disk drives for reading from or writing to removable optical disk such as a compact disc-rewritable (CD-RW) or other optical media, flash memory, etc. For example, such a storage medium is illustrated in FIG. 1 by HDD 18. The drives and their associated computer-readable media provide non-transient, non-volatile storage of computer-executable instructions, data structures, program modules, and other data for the computer. Various embodiments employing software and/or web implementations are accomplished with standard programming techniques. Computer(s) are configured by software, hardware, firmware, or a combination thereof, to perform functions as described herein. In a particular embodiment, the host device 10 includes a calibration application 17 (e.g., software instructions resident in the system memory 19, as shown) that is executable by the CPU 14 to direct calibration of the UE 12. For example, the calibration application 17 may communicate data to the UE 12 that causes the UE 12 to perform various calibration operations or routines, as further described herein. Alternately, or in addition, functionality described with reference to the calibration application 17 may be implemented using hardware, such as an integrated circuit or other hardware device designed to perform the functions described herein.

According to various embodiments, the UE 12 also includes its own processor(s) and memory, connected by a system bus that connects the various system components of the UE 12. The UE 12 processor(s) is configured to perform functions as described herein. For example, in a particular embodiment, functionality described herein with reference to the UE 12 may be performed via execution of instructions resident in a memory of the UE 12. Alternately, or in addition, such functionality may be implemented using hardware, such as an integrated circuit or other hardware device. To illustrate, the UE 12 may include software instructions and/or hardware devices that are operable to perform one or more calibration routines 13 in response to calibration instructions received from the calibration application 17 of the host device 10. As further described herein, multiple such calibration instructions may be included in a calibration segment, and each calibration segment may have a different duration.

The host device 10 and the UE 12 may each include at least one interface (e.g., a device interface or a network interface) to support bidirectional communication between the host device 10 and the UE 12. For example, such an interface may include a wired or wireless interface, including but not limited to a universal serial bus (USB) interface, an Ethernet interface, a wireless local area network (WLAN) interface, etc.

During operation, the calibration application 17 may send data to the UE 12 to trigger performance of the calibration routines 13. For example, the calibration application 17 may send a calibration configuration packet (CCP) 100 (e.g., a data packet) to the UE 12. Each such CCP may include one or more instruction segments. For example, the CCP 100 may include a first instruction segment 110 and a second instruction segment 120. Each instruction segment may include one or more instructions and a segment-specific duration. For example, the first instruction segment 110 may include a first instruction 111 and a first duration 112 that is equal to the duration of the first instruction 111. The second instruction segment 120 may include a second instruction 121, a third instruction 122, and a second duration 123 that is equal to the duration of the set of instructions 121, 122. After calibration is complete, the calibration application 17 may fetch calibration results 130 from the UE 12, as shown.

Thus, multiple calibration instructions 111, 121, 122 may be sent in a single CCP 100, which may be faster than sending calibration instructions one-at-a-time. Moreover, each instruction segment 110, 120 may have a different segment duration, thereby enabling a calibration system to set individual durations for an individual calibration instruction or a set of calibration instructions. A particular example of a CCP is further described with reference to FIG. 4.

A generalized example of a process 2 carried out by a calibration application (e.g., the calibration application 17) is described with reference to FIG. 2. A corresponding generalized example of a process 3 carried out by a UE (e.g., the UE 12) is described with reference to FIG. 3. First, in step 20 of FIG. 2, a calibration configuration packet (CCP) is generated by the host device 10.

Figure 4:
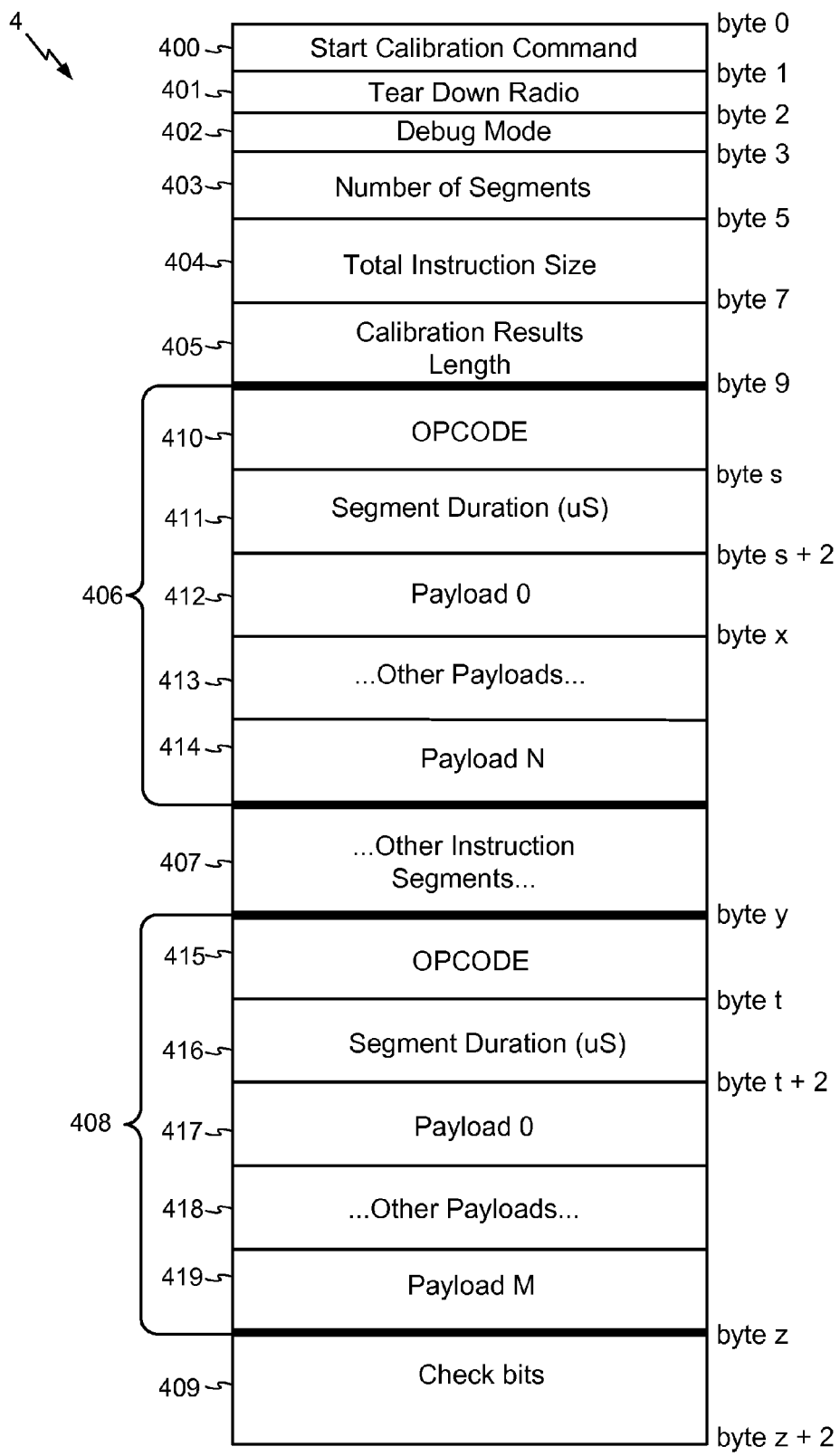
FIG. 4 illustrates a particular example of a calibration configuration packet according to an embodiment of the present disclosure.

According to various embodiments, calibration instructions are combined into one CCP or a set of multiple CCPs. As shown in FIG. 4 and described in further detail below, a CCP (e.g., illustrative CCP 4 of FIG. 4) includes one or more segments, where each segment includes one or more calibration instructions and where each calibration segment has a different (e.g., segment-specific) duration. A calibration instruction, according to various embodiments, includes a configuration or measurement instruction, or the like. According to various embodiments, the instruction is related to configuration or measurement of components such as, but not limited to, a transmitter, receiver, or the like, to be performed by the UE 12.

Figure 2:
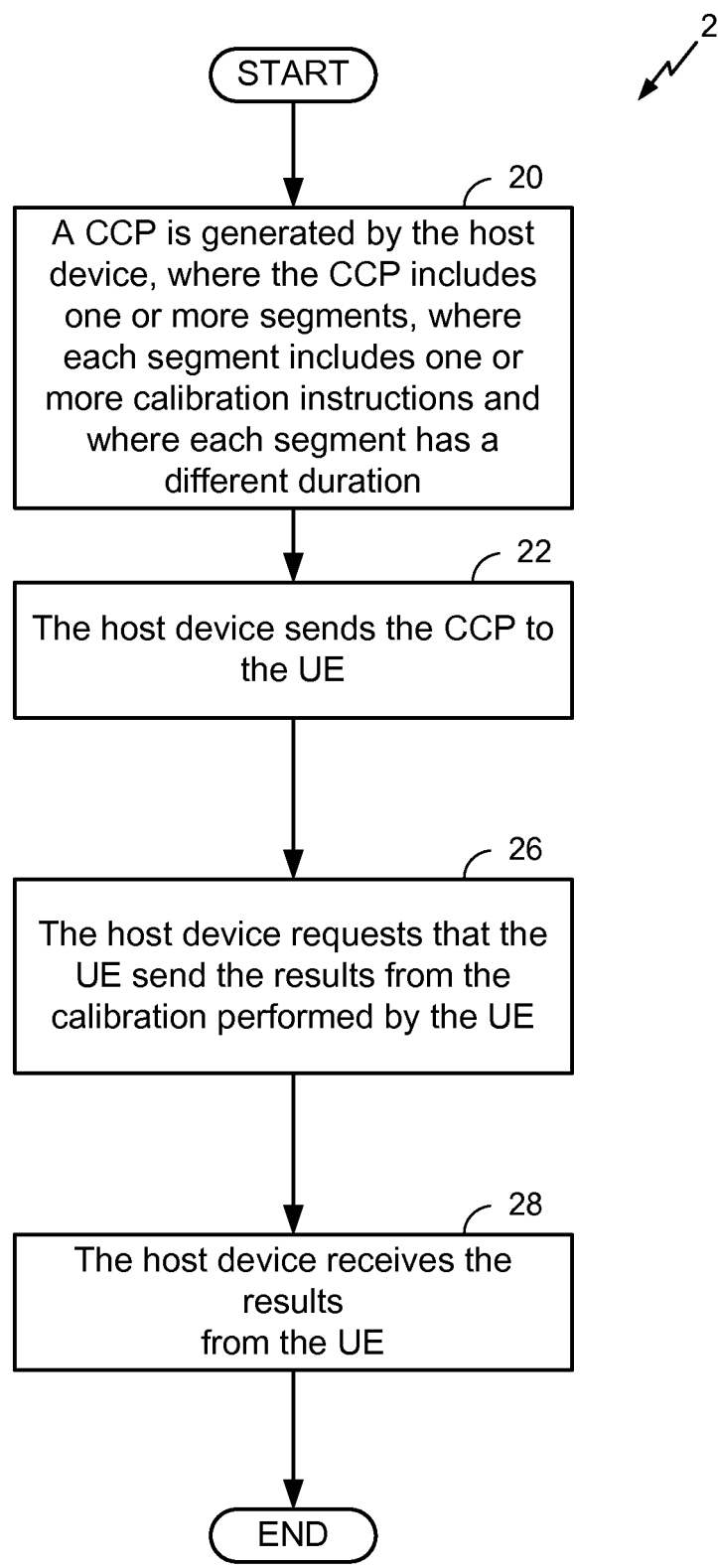
FIG. 2 illustrates a flow diagram of a process of a host-side implementation, according to an embodiment of the present disclosure.

In step 22 of FIG. 2, the host device 10 sends the CCP to the UE 12. In step 32 of FIG. 3, the UE 12 receives the CCP from the host device 10. The CCP includes one or more segments, where each segment includes one or more instructions and has a segment-specific duration. The UE 12 then proceeds to parse the CCP. This parsing enables the UE 12 to separate the calibration instructions so that they may be performed.

Figure 3:
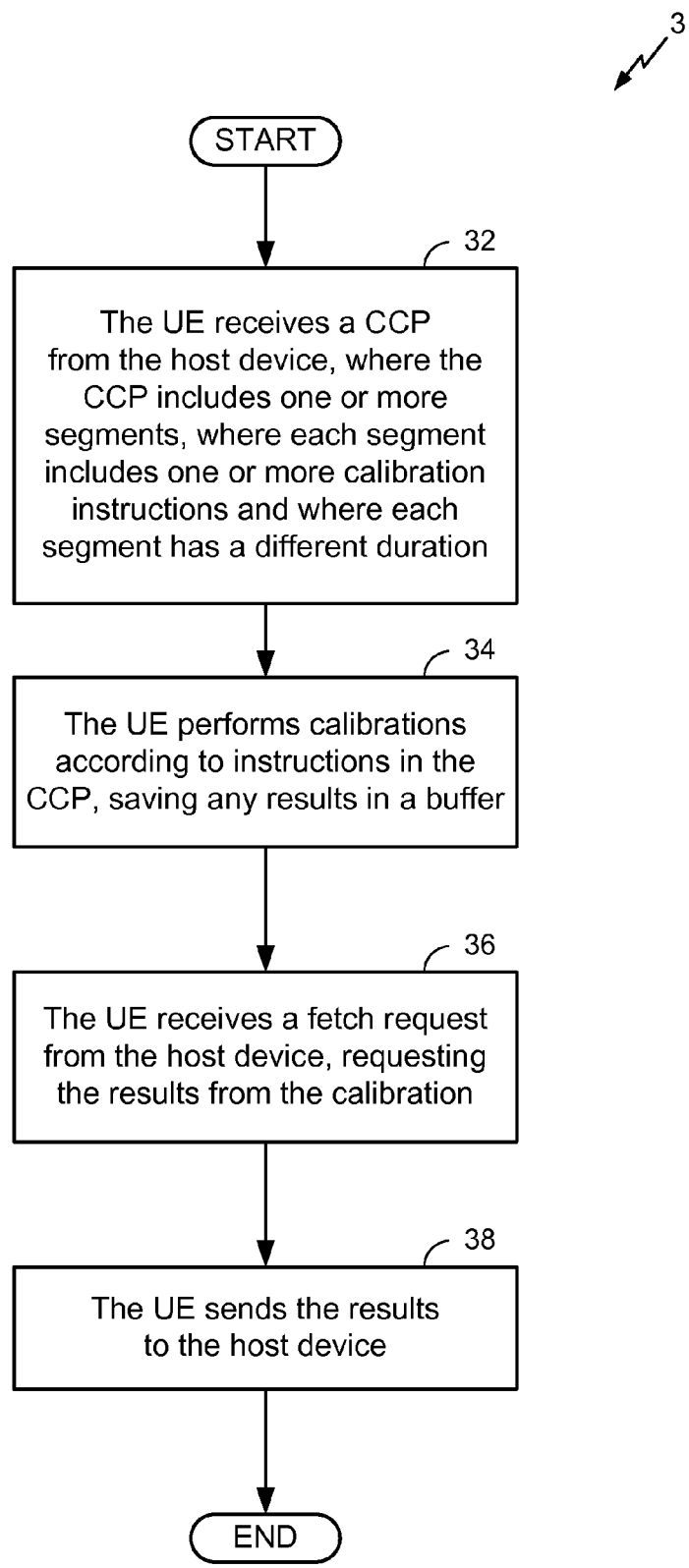
FIG. 3 illustrates a flow diagram of a process of an embedded-side implementation according to an embodiment of the present disclosure.

In step 34 of FIG. 3, the UE 12 performs calibrations according to the calibration instructions contained in the CCP. According to some embodiments, the instructions are executed in the order that they appear within the CCP. In further embodiments, prioritization and queuing processes may be carried out by the UE 12 to determine an order of execution of instructions so that some instructions may be executed in parallel. According to various embodiments, the result(s) of a calibration, if any, are stored in a results buffer by the UE 12.

In step 26 of FIG. 2, the host device 10 sends a fetch request to the UE 12 to request the results, if any, of the calibration. In step 36 of FIG. 3, the UE 12 receives the fetch request from the host device 10. The UE 12 prepares the results, if any, in one or more fetch response packets to be sent to the host device 10.

According to some embodiments, the host device 10 sends the fetch request at or after the time the calibrations are expected to have been completed by the UE 12. In further embodiments, if the results are not ready, the host device 10 tries again by sending another fetch request later.

In step 38 of FIG. 3, the UE 12 transmits the calibration results to the host device 10 in one or more fetch response packets. In step 28 of FIG. 2, the host device 10 receives the fetch response packet(s) from the UE 12. The methods of FIGS. 2 and 3 may be repeated and may continue until all desired calibration instructions are sent by the host device 10 to the UE 12 and performed by the UE 12, and until all desired calibration results are sent back to the host device 10 from the UE 12.

FIG. 4 shows an example of a CCP 4. Other embodiments of the present disclosure may employ other suitable data structures for a CCP. In FIG. 4, the CCP 4 includes a packet header that includes a Start Calibration Command 400, a Tear Down Radio Command 401, a Debug Mode Command 402, a Number of Segments field 403, a Total Instruction Size field 404, and a Calibration Results Length field 405. The CCP 4 also includes a first instruction segment 406, followed by other instruction segments 407, followed by a last instruction segment 408, followed by check bits 409 for error correction.

Each instruction segment 406, 407, 408 includes an opcode, a segment duration, and one or more payloads. For example, the first instruction segment 406 includes a first opcode 410, a first segment duration 411 (e.g., in microseconds), and payloads 412, 413, and 414. As another example, the last instruction segment 408 includes a last opcode 415, a last segment duration 416, and payloads 417, 418, and 419. As shown in FIG. 4, the total length of the CCP 4 is z+2 bytes. Of that, the packet header is nine bytes long, the length of each instruction segment 406, 407, and 408 is four bytes plus the length of the respective payload(s), and the check bits 409 are two bytes long.

According to some embodiments, the packet header begins with the Start Calibration Command 400, which signals to the UE 12 to begin calibration, and informs the UE 12 that this packet contains information regarding the configuration of the calibration. Thus, when the host device 10 sends multiple CCPs to the UE 12, the Start Calibration Command 400 may be asserted in the last CCP to initiate performance of calibration operations by the UE 12. According to some embodiments, the packet header includes the Tear Down Radio Command 401 indicating whether the UE 12 is to transition a radio of the UE 12 to a SLEEP state (or other power-save mode) at the end of calibration. Thus, the CCP 4 may enable performing certain power control operations during and after calibration. According to some embodiments, the packet header may include the Debug Mode Command 402 indicating whether or not debugging messages are to be generated, recorded, and/or sent to the host device 10 by the UE 12 during/after calibration. According to some embodiments, the packet header includes the Number of Segments field 403 indicating the number of instruction segments in the CCP 4. The number of instruction segments may be limited by the calibration capabilities of the UE 12. According to some embodiments, the packet header includes the Total Instruction Size field 404, and/or the Calibration Results Length field 405. The various fields of the packet header of the CCP 4 are further described in the table below.

TABLE 1

| | CCP Header Fields | |
|---|---|---|
| Type | Field | Details |
| UINT8 | Start Calibration Command | Indicates if the embedded side (e.g., UE) should begin executing calibration operations. This will be set to 1 by the calibration application when all CCP data is pushed and system is ready for calibration. |
| UINT8 | Tear Down Radio | Indicates if the radio is to be brought down to SLEEP state at the end of the calibration sweep. |
| UINT8 | Enable Debug Message (e.g., Debug Mode Command) | Used to enable diagnostic debug messages. This can be enabled while debugging calibration issues. By default, debugging may be disabled. |
| UINT16 | Number of segments | To indicate how many instruction segments are packed in the current packet (e.g., the CCP 4). |
| UINT16 | Payload Length (e.g., Total Instruction Size) | Payload length of CCP depending on how it is constructed based on opcodes. |
| UINT16 | Result Length (e.g., Calibration Results Length) | Length of the calibration results expected for this CCP. |

As used herein, a calibration sequence may include one or more calibration sweeps. Each calibration sweep may include one or more instruction segments (alternately referred to herein as "segments" or "calibration segments"), and each calibration segment may include one or more calibration instructions. According to various embodiments, there are one or more instruction segments per CCP 4. Each instruction segment corresponds to one calibration instruction or a set of multiple calibration instructions. Each instruction segment, according to various embodiments, begins with or otherwise includes an opcode. For example, the first instruction segment 406 includes the first opcode 410 and the last instruction segment 408 includes the last opcode 415. The opcode may be a set of bits or bytes that specifies a type of calibration to perform. For example, according to a non-limiting, exemplary embodiment, the opcode is two bytes, and bit 0 being asserted (e.g., set to 1 rather than 0) signals a configuration, bit 1 signals retune of a radio, bit 2 signals transmitter measurement calibration, bit 3 signals a housekeeping analog-to-digital converter detector (HDET) calibration, bit 4 signals receiver measurement calibration, bit 5 signals multicarrier receiver measurement calibration, bit 6 signals a waveform configuration, and bits 7 through 15 are reserved. Other embodiments may employ other suitable data arrangements for an opcode.

According to various embodiments, more than one bit of the opcode may be asserted (e.g., set to 1) within the same instruction segment. For example, more than one bit may be asserted if the corresponding calibrations can be performed simultaneously without interference. If the calibrations cannot be performed simultaneously, according to various embodiments, the corresponding calibration instructions are separated into different instruction segments.

Bits of an opcode may be reserved for the purpose of specifying the length of additional opcode bits in the segment. According to some embodiments, the reserved bits together represent a number that indicates the number of bytes of additional opcode bits. For example, if there are two reserved bits, then a value of the bits of 00 in binary (0 in decimal) indicates that the length of additional opcode is 0, meaning that there is no additional opcode. If the value of the bits is 10 in binary (2 in decimal), then the length of additional opcode is two bytes, and so on.

According to various embodiments, the segment duration (e.g., the segment duration 411, 416) is included in an instruction segment (e.g., the instruction segment 406, 407). The segment duration is the amount of time that an interrupt service routine (ISR) will run during the calibration. Thus, different durations can be specified, one for each segment. Thus, calibrations with a short duration may be completed more quickly than had the duration been set to a fixed amount for all calibration instructions.

According to various embodiments, a segment payload (e.g., the payloads 412-414, 417-419) is of variable length, which depends on the type of calibration instructions specified by the opcode. For example, in some non-limiting, exemplary embodiments, if the configuration opcode bit (bit 0) of the example above is asserted (e.g., set to 1), then the payload would contain at least a one-byte Mode Setting, a two-byte Channel Information, a one-byte Master Device Mask, and Slave Device IDs, one for each bit enabled in the Master Device Mask.

According to some embodiments, the length of an instruction segment is not included as a field in the instruction segment. This is because the opcode specifies what type of data will be in the payload, and the type of data determines the length of that data. Thus, in those embodiments, the size of the segment is indicated by the opcode.

According to some embodiments, the correctness of the CCP 4 is verified by checking the CCP 4 as received against the check bits 409. According to some embodiments, the check bits 409 are set to a predefined number, and are the last bits of the CCP 4. The UE 12 verifies that the check bits 409 are set to the predefined number, thereby verifying whether the length of the CCP 4 has been calculated correctly by the UE 12. If the calculation is incorrect, the wrong bits would be identified as the check bits 409, and these wrong bits would not likely be set to the predefined number. Therefore, the UE 12 would likely know that an error occurred.

Table 2 shows non-limiting, exemplary examples of fields of the CCP 4, including the header fields of Table 1 and payloads for a few calibration instructions, according to an embodiment of the present disclosure.

TABLE 2

CCP Fields

| Field | Type | Value | Description |
|---|---|---|---|
| CMD | UINT8 | 75 | Command code |
| SUB_SYS | UINT8 | 11 | Subsystem ID, i.e. factory test mode (FTM) |
| MODE | UINT16 | | RF Mode Id |
| CMD | UINT16 | 608 | Cmd, i.e. FTM_CFG_AND_EXEC_CAL_SWEEP |
| REQ_LEN | UINT16 | | Length of request packet. Size depends to number of segments. |
| RSP_LEN | UINT16 | | Length of response packet |
| START_CALIBRATION | UINT8 | | 1 indicates that this is the last packet for the sweep and the sweep should be executed. 0 would indicate more packets in queue to append. |
| TEAR_DOWN_RADIO | UINT8 | | 1 indicates last sweep and tear down can be done. 0 indicates more sweeps in the same mode to follow. |
| ENABLE_DBG_MSG_FLAG | UINT8 | | 1 indicates that debug diagnostic messages would be enabled |
| SEGMENTS | UINT16 | | Number of segments used for calibration. [N] |
| PAYLOAD_LENGTH | UINT16 | | Length of payload in the current packet |
| RESPONSE_LENGTH | UINT16 | | Length of response data expected in FTM_GET_CAL_SWEEP_RESULTS for the current packet payload |
| OPCODE | UINT16 | | Opcode bit mask to determine the actions in the segment. |
| INTERVAL | UINT16 | | Interval duration of each instruction segment in the units of microseconds |
| MASTER_MASK | UINT8 | | Each bit to represent the corresponding device |
| SLAVE_DEVICE | UINT32 | | 4 bits each from least significant bit (LSB) to indicate the Slave Device ID for each Master Device Mask bit. Invalid value = 0xF |
| RF MODE | UINT8 | | RF mode to be set |
| CHANNEL | UINT16 | | Channel to be set |
| TX_BANDWIDTH | UINT16 | | Tx Bandwidth to be set (long term evolution (LTE) only) |
| RX_BANDWIDTH | UINT16 | | Rx Bandwidth to be set (LTE only) |
| DC_CHAN_OFFSET | UINT16 | | Offset to current channel for a $2^{nd}$ carrier in multicarrier (MC) |
| TX_WAVEFORM | UINT8 | | Tx waveform to be set |
| NUM_RBS | UINT8 | | Number of resource blocks (RBs) to configure for LTE waveform |
| START_RB | UINT8 | | Start RB to configure for LTE waveform |

TABLE 2-continued

CCP Fields

| Field | Type | Value | Description |
|---|---|---|---|
| TX_ACTION_LIST | UINT8 | | Enable a Tx Action in the segment |
| PA_STATE | UINT8 | | Power amplifier (PA) State to be set |
| RGI | UINT8 | | RF transceiver (RTR) Gain Index (RGI) to be set |
| PA_BIAS | UINT32 | | Average power tracking (APT) Bias value to be set |
| TX_FLAG | UINT8 | | Select which device to use based on the device mask |
| HDET_AVG | UINT8 | | Number of HDET Samples for each segment. 0 means no HDET measurement. |
| LPM_HDET_AVG | UINT8 | | Number of low power mode (LPM) HDET Samples for each segment. 0 means no LPM HDET measurement. |
| HDET_FLAG | UINT8 | | Select which device to use based on the device mask |
| RX_CAL_ACTION | UINT16 | | Bit mask to select the Rx gain state to calibrate in the current segment |
| RX_PWR_MODE | UINT8 | | 0 - LPM, 1 - high power mode (HPM) |
| EXP_RXAGC | INT16 | | Rx automatic gain control (AGC) corresponding to the Rx Power Level |
| RX_FLAG | UINT8 | | Select device to use based on the device mask |
| CHECK_BITS | UINT16 | | To check the correctness of the packet formation. For example, the check bits may be 0xDADA. |

According to some embodiments, the opcode bits may specify that configuration should occur rather than calibration. A non-limiting, exemplary table describing a payload of a configuration-only opcode is provided in Table 3.

TABLE 3

Configuration-Only CCP

| Field | Type | Value | Description |
|---|---|---|---|
| MASTER_DEVICE_MASK | UINT8 | | To select which master devices to configure |
| SLAVE_DEVICE_ID [N] | UINT8 | | Slave IDs for each Master bit enabled in MASTER_DEVICE_MASK |
| RF MODE | UINT8 | | RF mode to be set |
| CHANNEL | UINT16 | | Channel to be set |
| TX_BANDWIDTH | UINT16 | | Tx Bandwidth for LTE Waveform |
| RX_BANDWIDTH | UINT16 | | Rx Bandwidth for LTE Waveform |
| DC_CHAN_OFFSET | UINT16 | | Offset to current channel for $2^{nd}$ carrier in MC |

According to some embodiments, receiver measurement calibration is separated into two opcode bits: one for receiver configuration and one for receiver measurement calibration. This enables the configuration and calibration process to run in parallel, further reducing overall calibration time.

Other types of calibration or configuration may be run in parallel as well, according to various embodiments. In such a case, one calibration may finish before another has been completed. In that case, according to some embodiments, the next calibration is started while the other continues, as long as one configuration or calibration process does not interfere with the other.

A non-limiting, exemplary table describing a payload of a receiver measurement calibration opcode is provided in Table 4.

TABLE 4

Receiver Measurement CCP

| Field | Type | Value | Description |
|---|---|---|---|
| RX_CAL_ACTION | UINT16 | | Select the Rx action to be performed |
| RX_PWR_MODE | UINT8 | | 0 - LPM, 1 - HPM |
| EXP_RXAGC | INT16 | | RxAGC corresponding to the Rx Power Level |
| RX_FLAG | UINT8 | | Select device to use based on the device mask |

A non-limiting, exemplary table describing an opcode and corresponding payload of a transmitter measurement calibration opcode is provided in Table 5.

TABLE 5

Transmitter Measurement CCP

| Field | Type | Value | Description |
|---|---|---|---|
| TX_ACTION | UINT8 | | Select the action to be performed if any |
| PA_STATE | UINT8 | | PA State to be set |
| RGI | UINT8 | | RTR Gain Index to be set |
| PA_BIAS | UINT32 | | APT Bias value to be set |
| TX_FLAG | UINT8 | | Select which device to use based on the device mask |

According to some embodiments, after receiving the CCP 4, a response packet is sent by the UE 12 and received by the host device 10. Table 6 is a non-limiting, exemplary response packet according to an embodiment of the present disclosure.

TABLE 6

Response Packet

| Field | Type | Value | Description |
|---|---|---|---|
| CMD | UINT8 | 75 | Command code |
| SUB_SYS | UINT8 | 11 | Subsystem ID, i.e. FTM |
| MODE | UINT16 | 20 | RF Mode Id |
| CMD | UINT16 | 608 | Cmd, i.e. FTM_CFG_AND_EXEC_CAL_SWEEP |
| REQ_LEN | UINT16 | | Length of request packet. Size depends on number of segments. |
| RSP_LEN | UINT16 | 14 | Length of response packet |
| STATUS | INT32 | | Error/success code |

Figure 5:
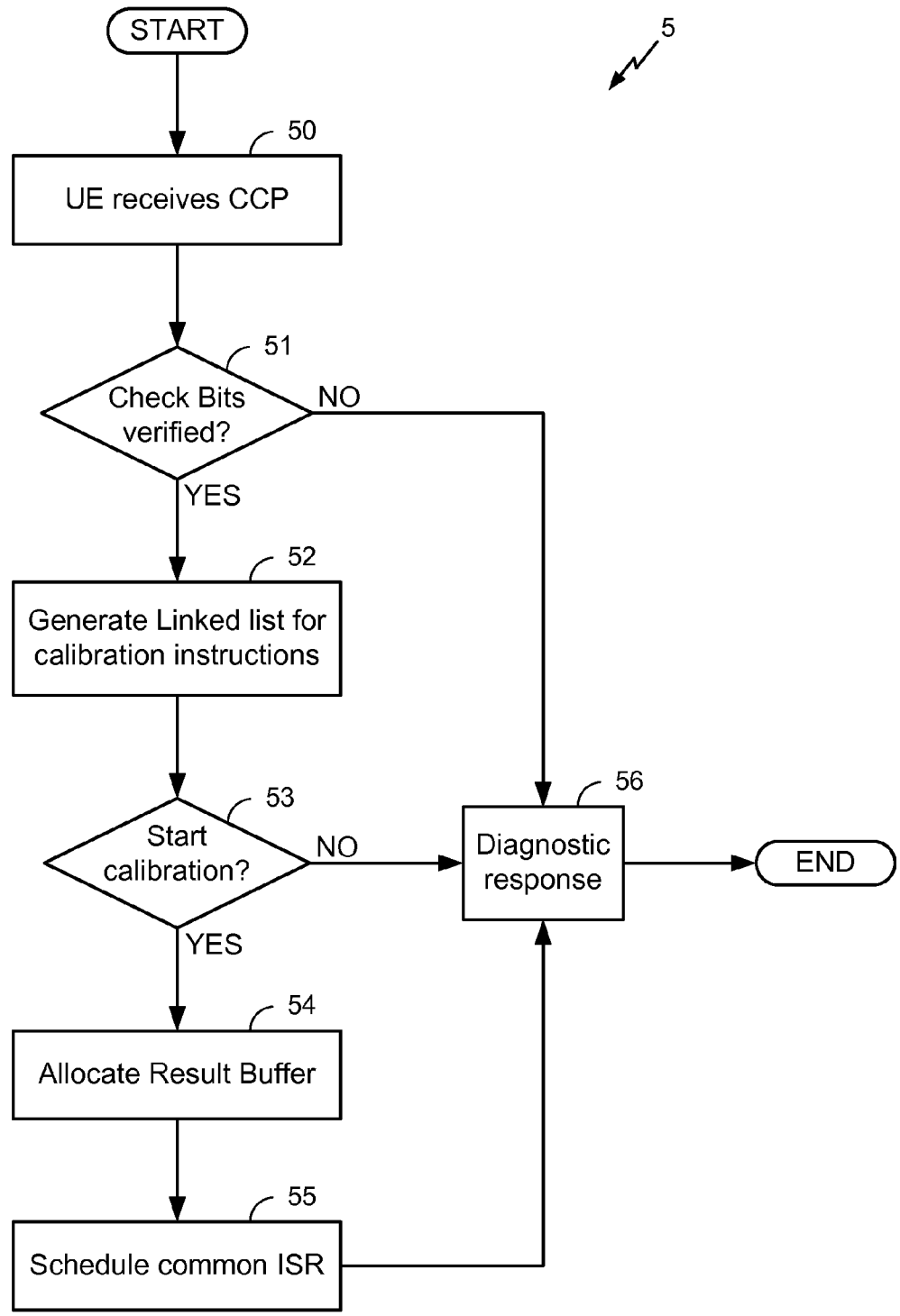
FIG. 5 illustrates a flow diagram of a process of an embedded-side implementation of calibration configuration according to an embodiment of the present disclosure.
Figure 6A:
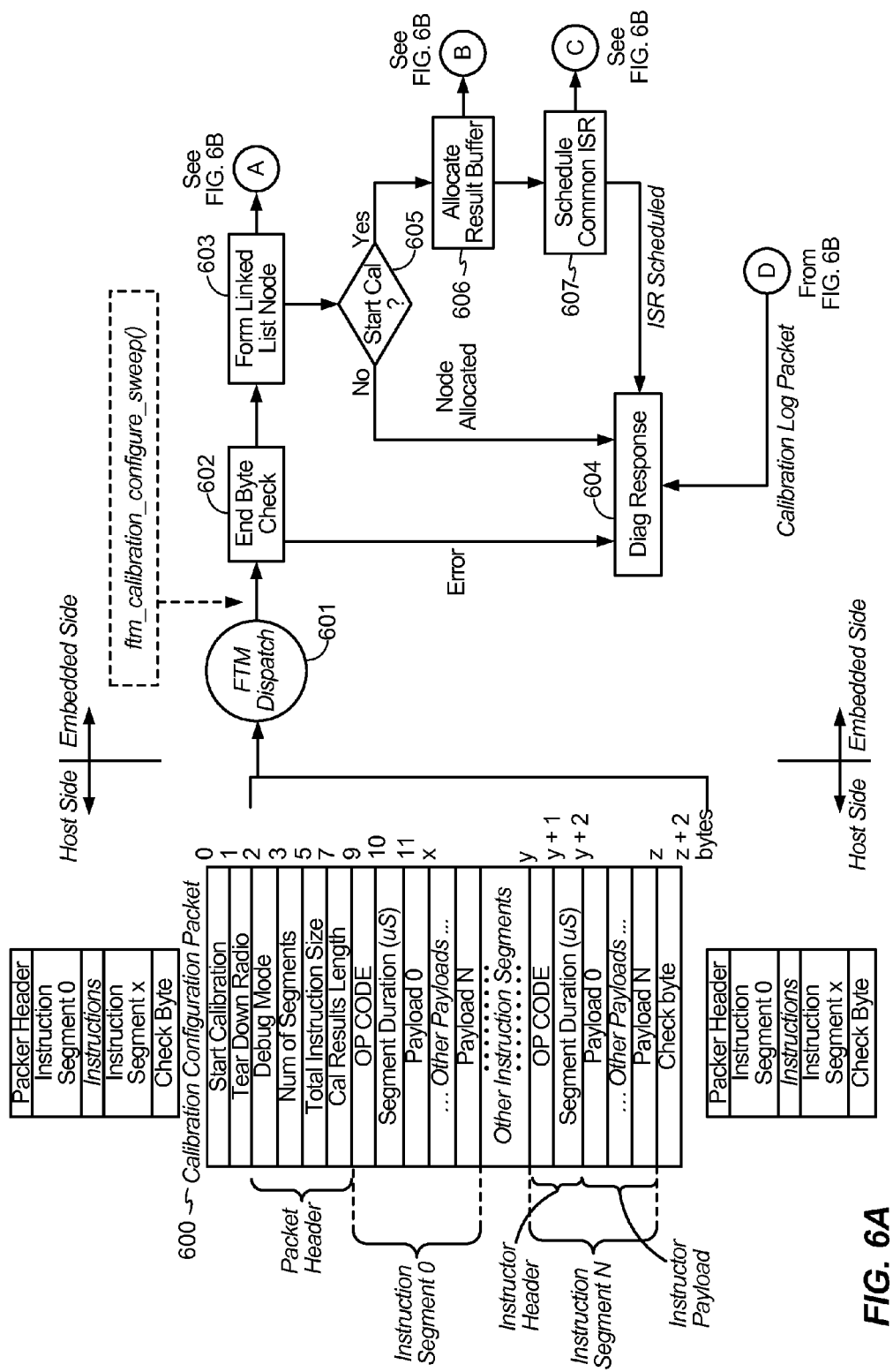
FIG. 6A and FIG. 6B illustrate a more detailed flow diagram of a process of an embedded-side implementation of calibration configuration according to an embodiment of the present disclosure.
Figure 6B:
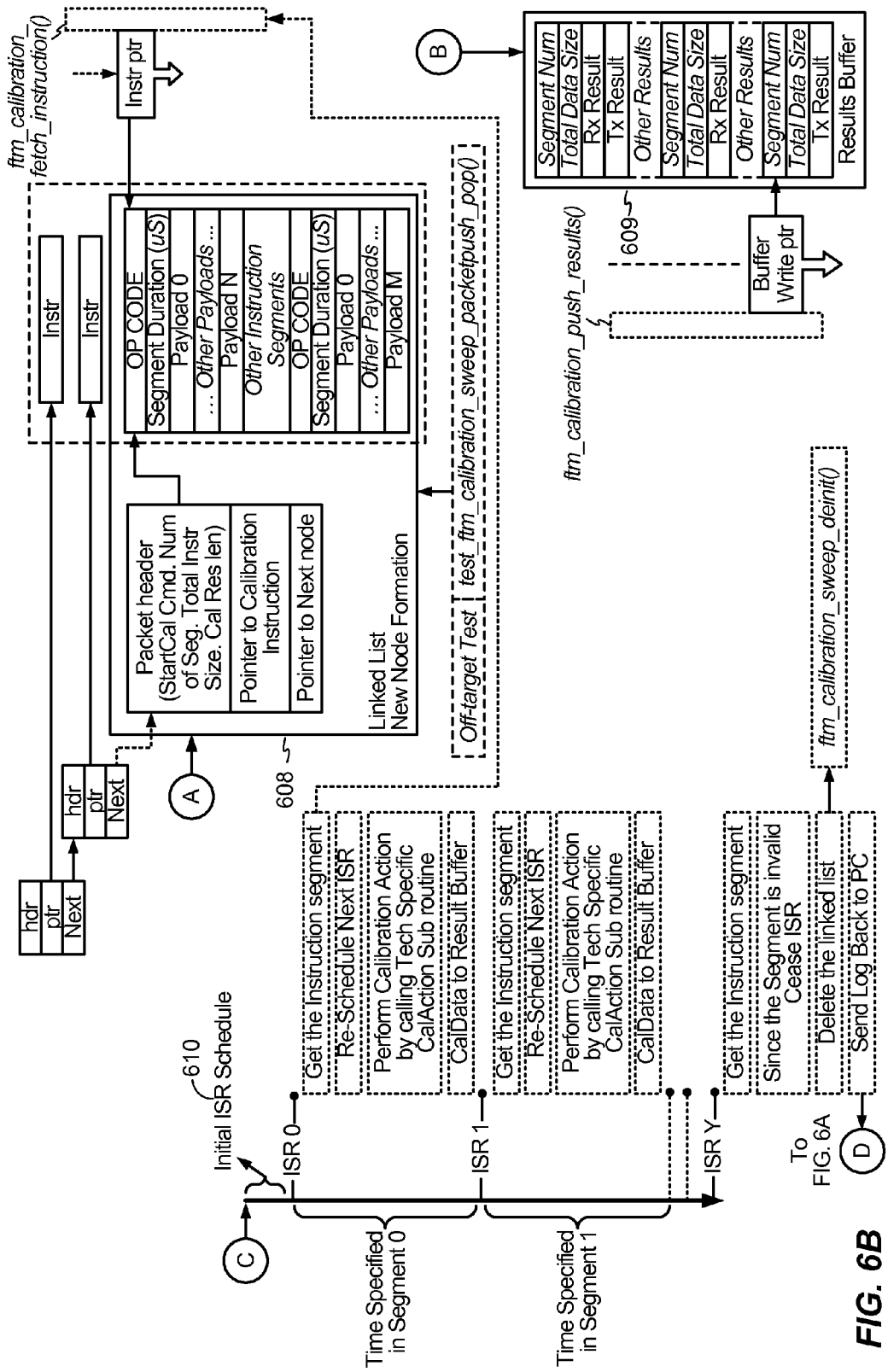

FIG. 5 is an example that illustrates a process 5 carried out by the UE 12 according to an embodiment of the present disclosure. FIGS. 6A and 6B illustrate a more detailed diagram of embedded-side (e.g., UE-side) operations in accordance with various embodiments described herein. In step 50 of FIG. 5, the UE 12 receives the CCP 4 that was sent from the host device 10.

In step 51, the check bits 409 are verified, as discussed above. If the CCP 4 cannot be verified, then according to some embodiments, the CCP 4 is considered incorrect, and calibration is not performed. A diagnostic response may be provided to indicate the failure to verify the CCP 4, at 56.

If the check bits 409 match the CCP 4 as expected, the instruction segments 406, 407, 408 of the CCP 4 are parsed. According to some embodiments, the calibration instructions are separated such that each instruction or set of multiple instructions is stored by the UE 12 in a different node of a linked list. The disclosed techniques may thus utilize dynamic memory allocation/deallocation. For example, each time a UE receives a CCP, the UE may generate a new node in a linked list and add the received CCP (or data therein) to the new node, as shown in FIGS. 6A and 6B. Thus, a linked list for calibration instructions of the CCP 4 may be created, at step 52.

In step 53, according to some embodiments, it may be determined whether calibration can be started. To illustrate, the UE 12 is checked for features that require calibration. For example, different UEs may have different features and some devices (e.g., older or legacy devices) may not support all of the advanced features supported by newer devices. Therefore, a one-time check of UE features is performed before the calibration. According to some embodiments, if one or more features required for a particular calibration instruction are missing from the UE 12, then the particular calibration instruction is not executed. A diagnostic response may be generated to indicate the unavailability of features and inability to start calibration, at 56.

According to some embodiments, if the required features are available, then calibration is performed on the UE 12. According to some embodiments, as each calibration instruction is executed, the result, if any, is stored in a results buffer (e.g., a dynamically allocated results buffer). According to some embodiments, the results are stored in the same order as the corresponding calibration instructions appeared in the CCP 4. However, in some embodiments, some or all of the calibrations may be performed in a different order than the order of the calibration instructions in the CCP 4. In that case, according to some embodiments, the result is stored in the buffer and/or the results packet is sent to the host device 10 in the same order as the calibration instructions appeared in the CCP 4. A results buffer may thus be allocated and populated, at 54

In step 55, a common interrupt service routine (ISR) is scheduled. According to some embodiments, a duration of time of the ISR is based on the segment durations 411, 416 of the CCP 4. For each segment, the ISR is scheduled according to the corresponding segment duration. The ISR conducts interrupts during the calibration process. At the end of the last segment, the ISR will be disabled. According to some embodiments, to reduce timer drift, interrupt time may be scheduled based on a single reference time instead of based on a "current" time.

In contrast to existing ISR-based calibrations, according to some embodiments, a trigger will not be implicitly set by an embedded driver by moving to the lowest transmitter power for the first segment 406. Instead, a trigger parameter is part of the CCP 4 so that the embedded driver is agnostic to the trigger.

In step 56, a diagnostic response is readied to provide feedback on the success, failure, or other results of the calibration process.

FIGS. 6A and 6B illustrate device calibration in accordance with one or more embodiments of the disclosure. For ease of illustration, FIGS. 6A and 6B illustrate "host side" (e.g., a personal computer (PC) or other device directing calibration, such as the host device 10) operations to the left and "embedded side" (e.g., a mobile device or other device that is being calibrated, such as the UE 12) operations to the right.

As shown in FIG. 6A, the calibration application (e.g., the calibration application 17) may generate one or more CCPs, such as an illustrative CCP 600. In an illustrative embodiment, the CCP 600 may be the CCP 4 of FIG. 4. In the implementation shown, the CCP 600 includes a 9-byte header, N payloads, and a 2-byte error correction portion (designated "check byte"). The calibration application may send the CCP 600 to the mobile device via a factory test mode (FTM) dispatch 601.

The mobile device (e.g., the UE 12) may use a linked list to store received CCPs and/or data therein. Upon receiving the CCP 600, the mobile device may check for alignment errors (e.g., using the check byte portion of the CCP 600), as shown at 602. If an alignment error is detected, the mobile device may generate a diagnostic response, at 604, indicating the alignment error. If no alignment error is present, the mobile device may form a new linked list node for the CCP 600, as shown at 603. A more detailed example of a linked list structure is illustrated in FIG. 6B, at 608. Each linked list node may include a packet header, a next pointer (e.g., to a next linked list node), and a pointer to node data (e.g., calibration instruction(s)), as shown at 608.

As described above with reference to FIG. 4, the "Start Calibration" command of the last CCP in a calibration sweep may be asserted to initiate calibration operations at the mobile device. In response to determining that the "Start Calibration" command of the received CCP 600 is not asserted, at 605, the mobile device may generate a diagnostic response to indicate the creation of a linked list node for the received CCP 600 was successful, at 604. In response to determining that the "Start Calibration" command is asserted, at 605, the mobile device may allocate a result buffer, at 606, and schedule a common interrupt service routine (ISR), at 607. A more detailed example of a result buffer structure is shown in FIG. 6B, at 609. A more detailed example of an ISR schedule, including time per calibration segment, is shown in FIG. 6B, at 610. In a particular embodiment, after calibration is complete and all results have been provided to the calibration application, the mobile device may deinitialize dynamically generated data structures and transmit a calibration log to the calibration application. A diagnostic response indicating success of calibration may be generated, at 604.

Figure 7:
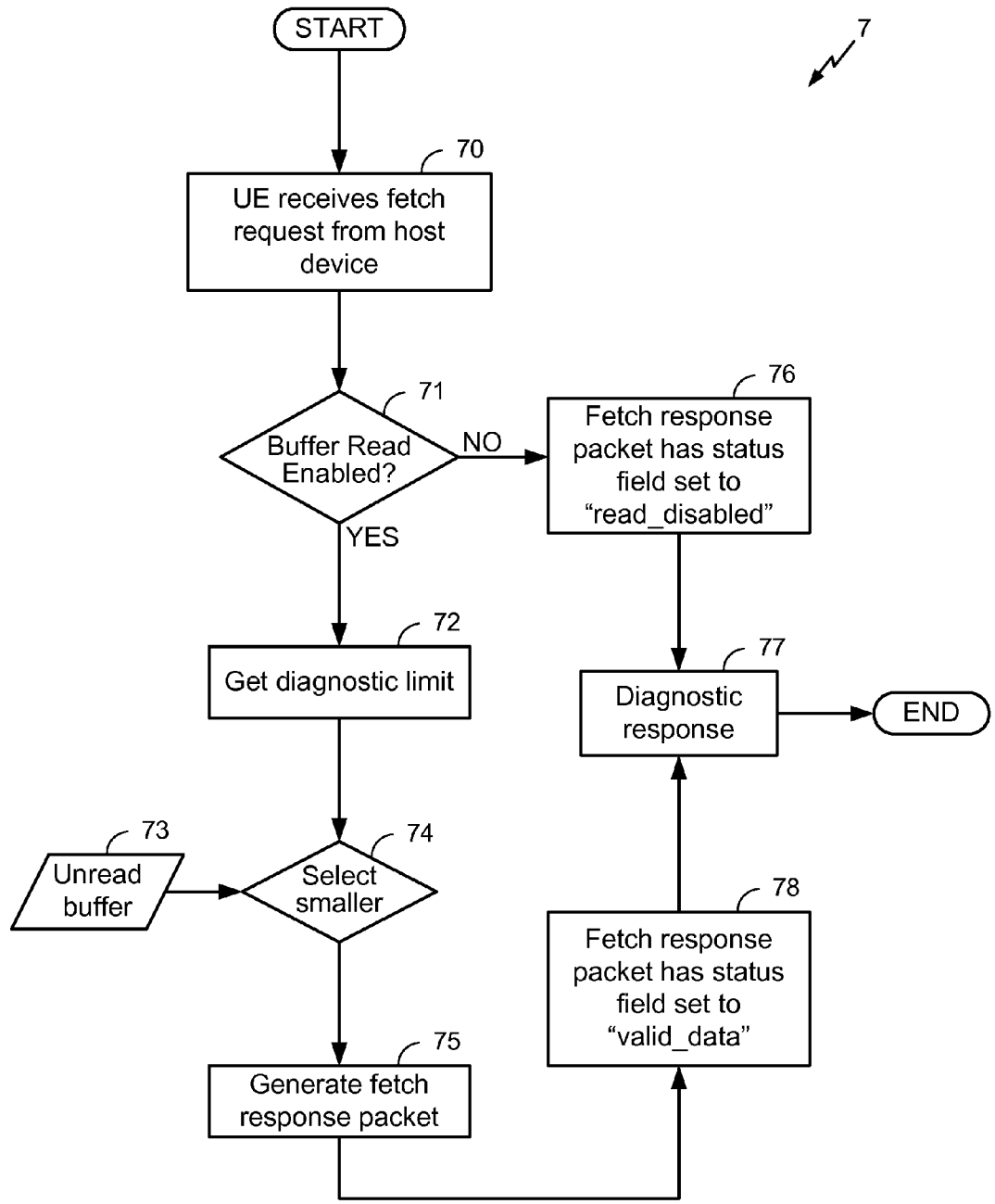
FIG. 7 illustrates a flow diagram of a process of an embedded-side implementation of calibration result fetch according to an embodiment of the present disclosure.
Figure 8:
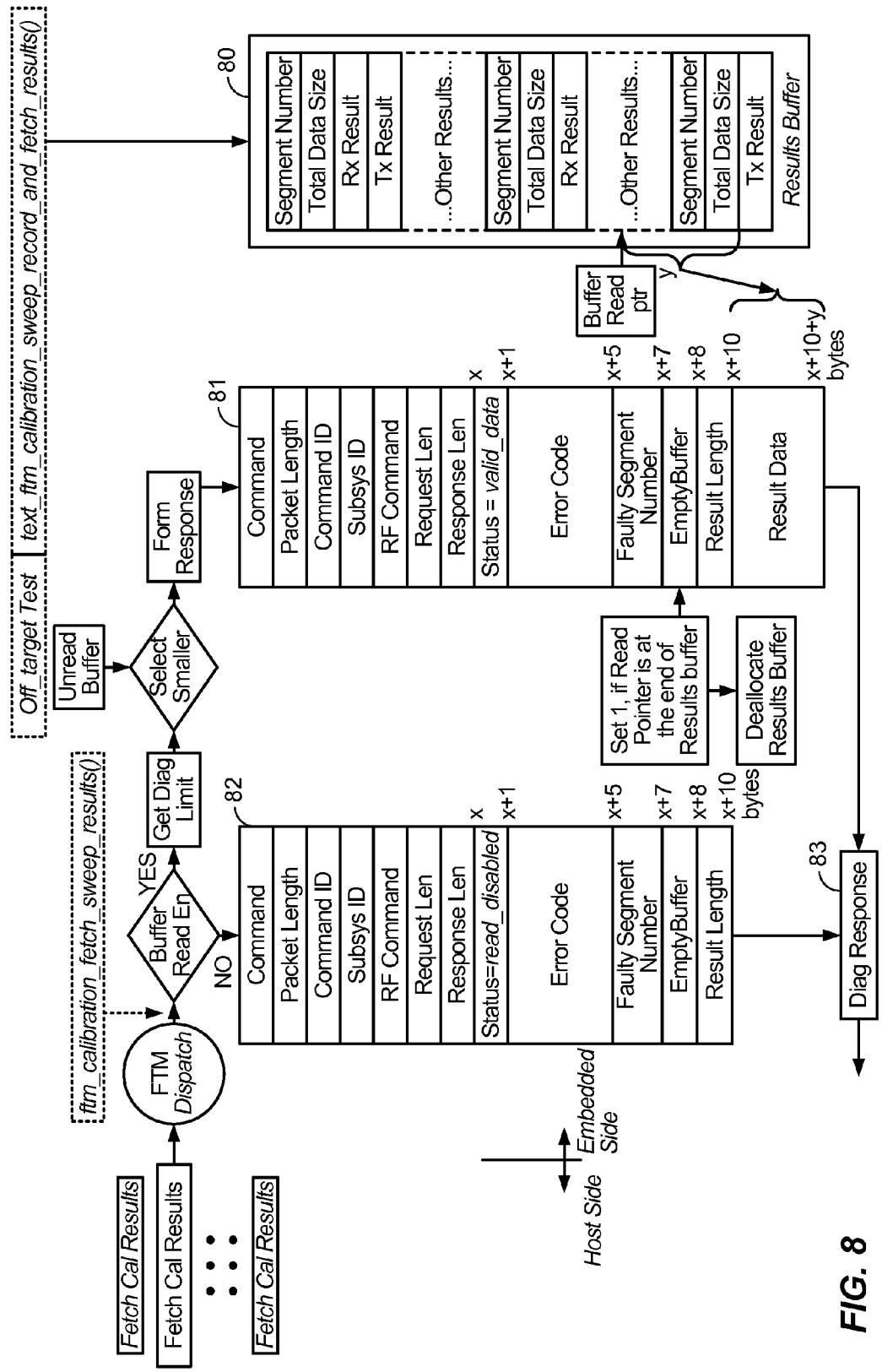
FIG. 8 illustrates a more detailed flow diagram of a process of an embedded-side implementation of result fetch according to an embodiment of the present disclosure.

FIG. 7 is an example of a process 7 carried out by the UE 12 according to an embodiment of the present disclosure. FIG. 8 is a more detailed diagram of embedded-side (e.g., UE-side) operations to fetch and return calibration results. After a calibration process, in step 70 of FIG. 7, the UE 12 receives a fetch request that was sent by the host device 10. The fetch request is a request that the results of the calibration process be sent to the host device 10. Table 7 shows a non-limiting, exemplary fetch request packet according to an embodiment of the present disclosure.

TABLE 7

Fetch Request Packet

| Field | Type | Value | Description |
|---|---|---|---|
| CMD | UINT8 | 75 | Command code |
| SUB_SYS | UINT8 | 11 | Subsystem ID, i.e. FTM |
| MODE | UINT16 | 20 | RF Mode Id, i.e. FTM_1X_C |
| CDMA_CMD | UINT16 | 609 | Command, i.e. FTM_GET_CAL_SWEEP_RESULTS |
| REQ_LEN | UINT16 | | Length of request packet. Size depends to number of segments. |
| RSP_LEN | UINT16 | | Length of response packet |

According to some embodiments, after receiving the fetch request packet, a fetch response packet is sent by the UE 12 and received by the host device 10. The fetch response packet may include the results of the calibration, if results were generated and the reading of the results buffer is currently enabled. Table 8 shows a non-limiting, exemplary fetch response packet according to an embodiment of the present disclosure.

TABLE 8

Fetch Response Packet

| Field | Type | Value | Description |
|---|---|---|---|
| CMD | UINT8 | 75 | Command code |
| SUB_SYS | UINT8 | 11 | Subsystem ID, i.e. FTM |
| MODE | UINT16 | 20 | RF Mode Id, i.e. FTM_1X_C |
| CDMA_CMD | UINT16 | 609 | Cmd, i.e. FTM_GET_CAL_SWEEP_RESULTS |
| REQ_LEN | UINT16 | | Length of request packet. Size depends to number of segments. |
| RSP_LEN | UINT16 | 14 | Length of response packet |
| STATUS | UINT8 | | For error/success code |
| ERROR_CODE | UINT64 | | Each bit indicating one error condition |
| ERR_CODE_SEG_NUM | UINT16 | | Segment number at which the error occurred |
| EMPTY_RES_BUFFER | UINT8 | | 1 indicates that no fetch is anticipated and 0 indicates that buffer is not empty so more results are to be returned. |
| PAYLOAD_LEN | UINT16 | | Length of the result payload |
| SEG_NUM | UINT16 | | Segment number for which results are appended |
| NUM_RES_BYTES | UINT8 | | Number of bytes of result values appended for the above segment number |
| RX_RESULTS | INT16 | | Rx Results for the cal sweep |
| HDET_RESULTS | UINT16 | | HDET Results for the sweep |
| LPM_HDET_RESULTS | UINT16 | | LPM HDET Results for the sweep |

In some embodiments, prior to the fetch response packet being sent to the host device 10, the UE 12 may dynamically allocate buffers to store calibration results, where buffer allocation occurs after all CCP information is stored into the linked list but before calibration begins. The size of the results buffer may be based on an expected results size (e.g., the Calibration Results Length field 405 of the CCP 4 of FIG. 4). An example of the results buffer is further described with reference to FIG. 8.

In step 71 of FIG. 7, the UE 12 determines whether reading the results buffer is enabled. If reading the results buffer is not enabled, then a fetch response packet is generated in step 76, but the result data is not included in the fetch response packet. The status field of the fetch response packet is set to specify that the read has been disabled, and thus there is no results data included in the fetch response packet.

According to some embodiments, if buffer read is enabled, then a limitation on the size of the results buffer to be returned to the host device 10 is determined in step 72. In step 74, if a size of the unread buffer (designated 73) is smaller than the limitation on the size of the results buffer, then the size of the results buffer will be based on the size on the unread buffer 73. If the size of the unread buffer 73 is larger than the limitation on the size of the results buffer, then the size of the results buffer will be based on the limitation on the size of the results buffer.

In step 75, according to various embodiments, the fetch response packet is generated, including the stored results data, if any. In step 78, a status field of the fetch response packet is set to specify that the packet contains results data. In step 77, according to some embodiments, the fetch response packet is sent from the UE 12 and received by the host device 10.

It should be noted that CCPs, such as the CCP 4 of FIG. 4, may include various opcodes to instruct the UE 12 to perform various functions. Thus, different opcodes may be defined for different desired calibration/measurement operations, where each opcode indicates a particular operation and is associated with a segment duration (e.g., in microseconds) and payload(s). For example, in a particular embodiment, the opcode may be a two-byte data element, where each bit of the opcode, when enabled/asserted, indicates a particular size and type of payload. To illustrate, bit 0 may indicate configuration, bit 1 may indicate retuning, bit 2 may indicate waveform configuration, bit 3 may indicate transmitter measurement, bit 4 may indicate HDET, bit 5 may indicate receiver configuration, bit 6 may indicate receiver measurement, and bits 7-15 may be reserved. Table 9 shows non-limiting, exemplary opcode payloads according to such an embodiment.

TABLE 9

Selected Opcode Payloads

| Type | Field | Details |
|---|---|---|
| Opcode Mask: RF Config [Bit 0] | | |
| UINT8 | Master Device Mask | Master Device information |
| UINT32 | Slave Devices | 4 bits each from LSB for each bit (also from LSB) of Master Device Mask to indicate the Slave Device ID for the corresponding Master Device |
| UINT8 | RF Mode | The mode setting (True DRx is to be supported even if PRx mode is set) |
| UINT16 | Channel | Channel information |
| UINT16 | Tx Bandwidth | To specify the Tx bandwidth for waveform. (LTE only) |
| UINT16 | Rx Bandwidth | To specify the Rx bandwidth for waveform. (LTE only) |

TABLE 9-continued

Selected Opcode Payloads

| Type | Field | Details |
|---|---|---|
| UINT16 | Channel Offset | To specify the channel offset of the second carrier from center channel. (Multi-Carrier mode only) |
| Opcode Mask: Radio retune [Bit 1] | | |
| UINT8 | Master Device Mask | Master Device information |
| UINT16 | Channel | Channel information |
| UINT16 | Channel Offset | To specify the channel offset of the second carrier from center channel. (Multi-Carrier mode only) |
| Opcode Mask: Configure Waveform [Bit 2] | | |
| UINT8 | Tx Waveform | Select type of Tx waveform |
| UINT8 | Number of RBs | Number of RBs for LTE waveform |
| UINT8 | Start RB | Start RB for LTE waveform |
| Opcode Mask: Tx Measurement [Bit 3] | | |
| UINT8 | Tx Action List | Bit 0 - Mobile Transmit Diversity (MTD) enable<br>Bit 1 - In-phase/Quadrature (IQ) Capture enable<br>Bit 2 - Envelope tracking (ET) enable<br>Bits 3-7 - Reserved |
| UINT8 | PA State | PA State to be set |
| UINT8 | RGI | RGI to be set |
| UINT32 | PA Bias | APT Bias Value to be set (could have multiple biases information which is to be parsed) |
| UINT8 | Tx Flag Field | Bits 0 to 3 - Tx Device mask<br>Bits 4-7 - Reserved |
| Opcode Mask: Measure HDET [Bit 4] | | |
| UINT8 | HDET Samples | if 0, then HDET read is disabled |
| UINT8 | LPM HDET Samples | if 0, then LPM HDET read is disabled |
| UINT8 | HDET Flag Field | Bits 0 to 3 - Tx Device mask<br>Bits 4-7 - Reserved |
| Opcode Mask: Rx Configuration [Bit 5] | | |
| UINT16 | Rx Cal Action | Select the Rx state to be calibrated<br>Bit 0 - low noise amplifier (LNA) 0 Cal/digital variable gain amplifier (DVGA) Cal<br>Bit 1 - LNA 1 Cal<br>Bit 2 - LNA 2 Cal<br>Bit 3 - LNA 3 Cal<br>Bit 4 - LNA 4 Cal<br>Bit 5 - LNA 5 Cal<br>Bits 6-7 - Reserved (for more LNA states)<br>Bit 8-15 - Reserved (for more Rx calibration routines) |
| UINT8 | Rx Power Mode | Select 0 = Low Power Mode (LPM) or 1 = High Power Mode (HPM) |
| UINT8 | Rx Flag Field | Bits 0 to 3 - Rx Device mask<br>Bits 4 to 7 - Reserved |
| Opcode Mask: Rx Measurement [Bit 6] | | |
| UINT16 | Rx Cal Action | Select the Rx state to be calibrated<br>Bit 0 - LNA 0 Cal/DVGA Cal<br>Bit 1 - LNA 1 Cal<br>Bit 2 - LNA 2 Cal<br>Bit 3 - LNA 3 Cal<br>Bit 4 - LNA 4 Cal<br>Bit 5 - LNA 5 Cal<br>Bits 6-7 - Reserved (for more LNA states)<br>Bit 8-15 - Reserved (for more Rx calibration routines) |
| UINT8 | Rx Power Mode | Select 0 = Low Power Mode (LPM) or 1 = High Power Mode (HPM) |
| UINT16 | Expected RxAGC | Corresponding to the Rx power level |
| UINT8 | Rx Flag Field | Bits 0 to 3 - Rx Device mask<br>Bits 4 to 7 - Reserved |

FIG. 8 illustrates fetching calibration results in accordance with one or more embodiments of the disclosure. For ease of illustration, FIG. 8 illustrates "host side" (e.g., a PC or other device directing calibration, such as the host device 10) operations to the left and "embedded side" (e.g., a mobile device or other device that is being calibrated, such as the UE 12) operations to the right.

As shown in FIG. 8, a results buffer 80 may include calibration results for multiple calibration segments. Each calibration segment may generate transmit (Tx) and/or receive (Rx) results. When reading the results buffer is enabled, data 81 transmitted to the calibration application may include x+10+y bytes, including x header/control bytes, y result data bytes (e.g., Rx results, Tx results, and/or other results from the results buffer 80), and a Status of "valid_data." Conversely, if buffer read is disabled, data 82 transmitted to the calibration application may include x+10 bytes, including a Status of "read_disabled" and no result data. In the example of FIG. 8, results data is provided using a diagnostic response, at 83. When the results buffer 80 has been emptied, the "Empty Buffer" field of the data 81 or 82 may be asserted, which may result in deallocation of the results buffer 80.

In conjunction with the described embodiments, an apparatus is disclosed that includes means for generating a data packet, where the data packet includes at least two segments and where each segment corresponds to at least one calibration instruction. For example, the means for generating may include the CPU 14 of FIG. 1, one or more other devices configured to generate a data packet, or any combination thereof. The apparatus also includes means for transmitting the data packet to a device to be calibrated. For example, the means for transmitting may include an interface (e.g., wired or wireless interface) of the host device 10 of FIG. 1, one or more other devices configured to transmit a data packet, or any combination thereof.

Further, another apparatus is disclosed that includes means for receiving, at a device to be calibrated, a data packet from a second device that directs calibration, where the data packet comprises at least two segments and where each segment of the at least two segments corresponds to at least one calibration instruction. For example, the means for receiving may include an interface of the UE 12 of FIG. 1, one or more other devices configured to receive a data packet, or any combination thereof. The apparatus also includes means for conducting a calibration of the device according to the calibration instructions. For example, the means for conducting a calibration may include a processing unit of the UE 12, one or more other devices configured to conduct calibration, or any combination thereof.

It is understood that the specific order or hierarchy of steps in the processes described herein are examples of exemplary approaches. It is understood that the specific order or hierarchy of particular steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method comprising:
   generating, using a processor of a computer, a data packet, wherein the data packet comprises a first segment that corresponds to a first calibration instruction and a second segment that corresponds to a second calibration instruction, wherein the first segment includes first opcode data that specifies a first type of calibration, wherein the second segment includes second opcode data that specifies a second type of calibration, and wherein each of the first opcode data and the second opcode data includes information indicating a length of additional opcode data of the respective segment of the data packet; and
   transmitting the data packet to a device to be calibrated.

2. The method of claim 1, further comprising:
   requesting, using the processor of the computer, calibration results from the device to be calibrated; and
   receiving, using the processor of the computer, the calibration results from the device to be calibrated.

3. The method of claim 1, wherein the first segment specifies a first duration of calibration and the second segment specifies a second duration of calibration, wherein the first duration of calibration is different from the second duration of calibration, wherein the first opcode data indicates a first length of first additional opcode data of the first segment, and wherein the second opcode data indicates a second length of second additional opcode data of the second segment.

4. An apparatus comprising:
   a processor configured to:
      generate a data packet, wherein the data packet comprises a first segment that corresponds to a first calibration instruction and a second segment that corresponds to a second calibration instruction, wherein the first segment includes opcode data that specifies a type of calibration, and wherein the opcode data includes information indicating a length of additional opcode data; and
      transmit the data packet to a device to be calibrated.

5. The apparatus of claim 4, wherein the processor is further configured to:
   request calibration results from the device to be calibrated; and
   receive the calibration results from the device to be calibrated.

6. The apparatus of claim 4, wherein the first segment specifies a first duration of calibration and the second segment specifies a second duration of calibration, and wherein the first duration of calibration is different from the second duration of calibration.

7. A method comprising:
   receiving, using a processor of a device to be calibrated, a data packet from a second device that directs calibration, wherein the data packet comprises a first segment that corresponds to a first calibration instruction and a second segment that corresponds to a second calibration instruction, wherein the first segment includes first opcode data that specifies a first type of calibration, wherein the second segment includes second opcode data that specifies a second type of calibration, and wherein each of the first opcode data and the second opcode data includes information indicating a length of additional opcode data of the respective segment of the data packet; and
   conducting a calibration of the device according to the first calibration instruction and the second calibration instruction.

8. The method of claim 7, further comprising:
   storing, at a storage medium of the device, one or more calibration results;
   receiving, using the processor of the device, a request for calibration results from the second device; and
   sending, using the processor of the device, the stored one or more calibration results to the second device.

9. The method of claim 7, wherein the first segment specifies a first duration of calibration and the second segment specifies a second duration of calibration, wherein the first duration of calibration is different from the second duration of calibration, and wherein the calibration of the device associated with a particular segment lasts an amount of time corresponding to a particular duration of calibration specified in the particular segment.

10. The method of claim 7, wherein conducting the calibration of the device includes conducting at least two operations in parallel, the at least two operations including calibration operations, configuration operations, or a combination thereof.

11. An apparatus comprising:
   a processor configured to:
      receive, at a device to be calibrated, a data packet from a second device that directs calibration, wherein the data packet comprises a first segment that corresponds to a first calibration instruction and a second segment that corresponds to a second calibration instruction, wherein the first segment includes opcode data that specifies a type of calibration associated with the first segment, and wherein the opcode data includes information indicating a length of additional opcode data; and
      conduct a calibration of the device according to the first calibration instruction and the second calibration instruction.

12. The apparatus of claim 11, further comprising a storage device configured to store one or more calibration results, wherein the processor is further configured to:
   receive a request for calibration results from the second device; and
   send the stored one or more calibration results to the second device.

13. The apparatus of claim 11, wherein the first segment specifies a first duration of calibration and the second segment specifies a second duration of calibration, wherein the first duration of calibration is different from the second duration of calibration, and wherein the calibration of the device of a particular segment lasts an amount of time corresponding to a particular duration of calibration specified in the particular segment.

14. The apparatus of claim 11, wherein conducting the calibration of the device includes conducting at least two operations in parallel, the at least two operations including calibration operations, configuration operations, or a combination thereof.

15. A non-transitory processor-readable medium comprising instructions that, when executed by a processor, cause the processor to:
generate a data packet, wherein the data packet comprises a first segment that corresponds to a first calibration instruction and a second segment that corresponds to a second calibration instruction, wherein the first segment specifies a first duration of calibration, wherein the second segment specifies a second duration of calibration, wherein the first duration of calibration is different from the second duration of calibration, wherein the first segment includes opcode data that specifies a type of calibration, and wherein the opcode data includes information indicating a length of additional opcode data; and
initiate transmission of the data packet to a device to be calibrated.

16. The non-transitory processor-readable medium of claim 15, further comprising instructions that, when executed by the processor, cause the processor to:
request calibration results from the device to be calibrated; and
receive the calibration results from the device to be calibrated.

17. A non-transitory processor-readable medium comprising instructions that, when executed by a processor, cause the processor to:
receive a data packet at a first device from a second device, wherein the data packet comprises a first segment that corresponds to a first calibration instruction and a second segment that corresponds to a second calibration instruction, wherein the first segment includes opcode data that specifies a type of calibration, wherein the opcode data includes information indicating a length of additional opcode data, and wherein conducting the calibration of the device includes conducting at least two operations in parallel, the at least two operations including calibration operations, configuration operations, or a combination thereof; and
conduct a calibration of the first device according to the first calibration instruction and the second calibration instruction.

18. The non-transitory processor-readable medium of claim 17, further comprising instructions that, when executed by the processor, cause the processor to:
store one or more calibration results;
receive a request for calibration results from the second device; and
send the stored calibration results to the second device.

19. The non-transitory processor-readable medium of claim 17, wherein the first segment specifies a first duration of calibration and the second segment specifies a second duration of calibration, wherein the first duration of calibration is different from the second duration of calibration, and wherein the calibration of the first device of a particular segment lasts an amount of time corresponding to a particular duration of calibration specified in the particular segment.

20. An apparatus comprising:
means for generating a data packet, wherein the data packet comprises a first segment that corresponds to a first calibration instruction and a second segment that corresponds to a second calibration instruction, wherein the first segment includes opcode data that specifies a type of calibration, and wherein the opcode data includes information indicating a length of additional opcode data; and
means for transmitting the data packet to a device to be calibrated.

21. An apparatus comprising:
means for receiving, at a device to be calibrated, a data packet from a second device that directs calibration, wherein the data packet comprises a first segment that corresponds to a first calibration instruction and a second segment that corresponds to a second calibration instruction, wherein the first segment includes opcode data that specifies a type of calibration, and wherein the opcode data includes information indicating a length of additional opcode data; and
means for conducting a calibration of the device according to the first calibration instruction and the second calibration instruction.

22. An apparatus comprising:
a memory storing a calibration configuration packet, wherein the calibration configuration packet comprises:
a header including a start calibration field that indicates whether calibration is to be started after receipt of the calibration configuration packet and a tear down radio field that indicates whether a radio of a device receiving the calibration configuration packet is to be transitioned into a power-save mode following calibration;
a first segment corresponding to a first calibration instruction and a second segment corresponding to a second calibration instruction, each of the first segment and the second segment including a corresponding opcode identifying a type of calibration operation, a corresponding segment duration, and one or more corresponding payloads; and
a check byte portion including error correction data.

23. The apparatus of claim 22, wherein the header further includes a field indicating a length of expected calibration results.

24. The apparatus of claim 22, wherein the first segment and the second segment each correspond to a particular calibration sweep, and wherein the particular calibration sweep is part of a particular calibration sequence.

25. The method of claim 1, wherein the data packet is transmitted during a factory test mode of the device to be calibrated, the factory test mode occurring before the device to be calibrated is sent to a customer.

26. The method of claim 7, further comprising:
prior to conducting the calibration, determining whether the device to be calibrated is able to conduct the calibration; and
transmitting a diagnostic response to the second device when the device to be calibrated is unable to conduct the calibration.

* * * * *